US012725895B2

(12) United States Patent
Sjöberg et al.

(10) Patent No.: US 12,725,895 B2
(45) Date of Patent: Sep. 1, 2026

(54) WAVEGUIDE CONNECTING TUBE HAVING CHAMFERED AND TAPERED EDGES CONFIGURED TO CONNECT WITH APERTURES IN FIRST AND SECOND WAVEGUIDE DEVICES

(71) Applicant: Telefonaktiebolaget LM Ericsson (publ), Stockholm (SE)

(72) Inventors: Daniel Sjöberg, Mölndal (SE); Göran Snygg, Partille (SE); Erik Carlsson, Mölnlycke (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 238 days.

(21) Appl. No.: 18/268,254

(22) PCT Filed: Dec. 22, 2020

(86) PCT No.: PCT/EP2020/087587
§ 371 (c)(1),
(2) Date: Jun. 19, 2023

(87) PCT Pub. No.: WO2022/135688
PCT Pub. Date: Jun. 30, 2022

(65) Prior Publication Data
US 2024/0055747 A1 Feb. 15, 2024

(51) Int. Cl.
*H01P 1/04* (2006.01)
*H01P 5/02* (2006.01)

(52) U.S. Cl.
CPC .............. *H01P 1/042* (2013.01); *H01P 5/024* (2013.01)

(58) Field of Classification Search
CPC ........................................................ H01P 1/042
(Continued)

(56) References Cited

U.S. PATENT DOCUMENTS 3,048,913 A * 8/1962 Ball, Jr. .................... F16B 7/00 285/24
4,675,633 A 6/1987 Young

FOREIGN PATENT DOCUMENTS

DE 820455 C 11/1951
EP 1104042 A2 5/2001
(Continued)

OTHER PUBLICATIONS

International Search Report and Written Opinion for International Patent Application No. PCT/EP2020/087587, mailed Sep. 24, 2021, 9 pages.
(Continued)

*Primary Examiner* — Benny T Lee
(74) *Attorney, Agent, or Firm* — Withrow & Terranova, PLLC

(57) ABSTRACT

The present disclosure relates to a waveguide interface comprising a first waveguide aperture, provided in a first waveguide device, a second waveguide aperture, provided in a second waveguide device, and a waveguide connecting tube having a longitudinal extension and comprising waveguide walls and a connecting waveguide aperture for transfer of microwave signals. The waveguide connecting tube comprises a first end that is adapted to be at least partly inserted into the first waveguide aperture, and a second end that is adapted to be at least partly inserted into the second waveguide aperture, such that the first waveguide aperture and the second waveguide aperture are electrically connected via the waveguide connecting tube.

11 Claims, 5 Drawing Sheets

(58) Field of Classification Search
USPC .......................................................... 333/254
See application file for complete search history.

(56) References Cited

FOREIGN PATENT DOCUMENTS

| | | | |
|---|---|---|---|
| EP | 3301750 | B1 | 3/2021 |
| FR | 1426256 | A | 1/1966 |
| GB | 1560533 | A | 2/1980 |
| JP | 2002009501 | A | 1/2002 |

OTHER PUBLICATIONS

Intention to Grant for European Patent Application No. 20838545.0, mailed Mar. 10, 2025, 8 pages.

* cited by examiner

WAVEGUIDE CONNECTING TUBE HAVING CHAMFERED AND TAPERED EDGES CONFIGURED TO CONNECT WITH APERTURES IN FIRST AND SECOND WAVEGUIDE DEVICES

This application is a 35 U.S.C. § 371 national phase filing of International Application No. PCT/EP2020/087587, filed Dec. 22, 2020, the disclosure of which is incorporated herein by reference in its entirety.

TECHNICAL FIELD

The present disclosure relates to waveguide interfaces at relatively high frequencies.

BACKGROUND

In many fields of wireless communication, such as microwave communication, as well as for applications associated with radars and other sensors using microwave technology, waveguides are used for transporting wireless signals, due to the low losses incurred in a waveguide.

When mounting or connecting one waveguide section to another waveguide section, it is important that the two waveguide sections are properly aligned such that mismatch between the two waveguide sections is avoided. For 5G, point-to-point and other wireless applications, frequencies are increasing which leads to decreasing waveguide dimensions. Each waveguide interface will then be very sensitive to misalignment between different mechanical interfaces. Today, different types of guiding pins are used, but for waveguides operating at high frequencies such as 70 GHz and higher, each interface will introduce a degradation of return loss where fractions of a millimeter in misalignment will cause a problem. With multiple interfaces, the return loss can be seriously degraded even if each individual interface has an acceptable misalignment.

There can also be a gap between two waveguide sections in a waveguide arrangement, and at such gaps the electromagnetic field can partly escape the waveguide arrangement which also affects return loss and transition loss, i.e. both unwanted reflections and losses occur. Counteracting such gaps by means of having high manufacturing tolerances is relatively costly, therefore different types of microwave gaskets are commonly used, for example resilient ring gaskets that comprise a conductive material and RF gaskets where a thin metal plate comprises resilient angled fingers that provide a spring load towards against a surface that should be electrically sealed.

It is, however, desired to obtain improved waveguide interfaces with respect to alignment and leakage via gaps.

SUMMARY

It is an object of the present disclosure to provide a waveguide interface with improved properties regarding alignment and leakage via gaps. It is also an object of the present disclosure to provide associated components and methods.

This object is obtained by means of a waveguide interface comprising a first waveguide aperture, provided in a first waveguide device, a second waveguide aperture, provided in a second waveguide device, and a waveguide connecting tube. The waveguide connecting tube has a longitudinal extension and comprises waveguide walls and a connecting waveguide aperture for transfer of microwave signals. The waveguide connecting tube comprises a first end that is adapted to be at least partly inserted into the first waveguide aperture, and a second end that is adapted to be at least partly inserted into the second waveguide aperture. In this way, the first waveguide aperture and the second waveguide aperture are electrically connected via the waveguide connecting tube.

This means that the waveguide devices can be electrically connected in an efficient manner, minimizing degradation of return loss due to misalignment as well as leakage without having to use RF gaskets.

According to some aspects, the waveguide connecting tube is adapted to interact with at least one other component when electrically connecting the first waveguide aperture to the second waveguide aperture, each other component comprising a corresponding component aperture adapted to interact with the waveguide connecting tube. According to some aspects, the other component is a circuit board and/or a cooling plate.

In this way, an accumulated misalignment that is increased for a plurality of components to be connected is eliminated.

According to some aspects, each end of the waveguide connecting tube is chamfered to have corresponding edge chamfers, where the waveguide devices comprise corresponding edge tapers. These edge tapers are adapted to be engaged by the edge chamfers of the waveguide connecting tube and to provide alignment when the waveguide connecting tube is inserted into each waveguide aperture.

In this way, increased alignment and efficient mounting is achieved.

According to some aspects, each edge taper is deformable along the longitudinal extension.

This deformation enables that a secure electrical and mechanical connection between the waveguide connecting tube and the waveguide devices is obtained.

According to some aspects, the waveguide interface comprises an electrically conductive paste applied between each end and walls of the corresponding waveguide aperture.

This provides enhanced electrical connections and reduces possible RF leakage.

This object is also obtained by means of waveguide connecting tubes and methods which are associated with the above advantages.

BRIEF DESCRIPTION OF THE DRAWINGS

The present disclosure will now be described more in detail with reference to the appended drawings, where.

DETAILED DESCRIPTION

Figure 1:
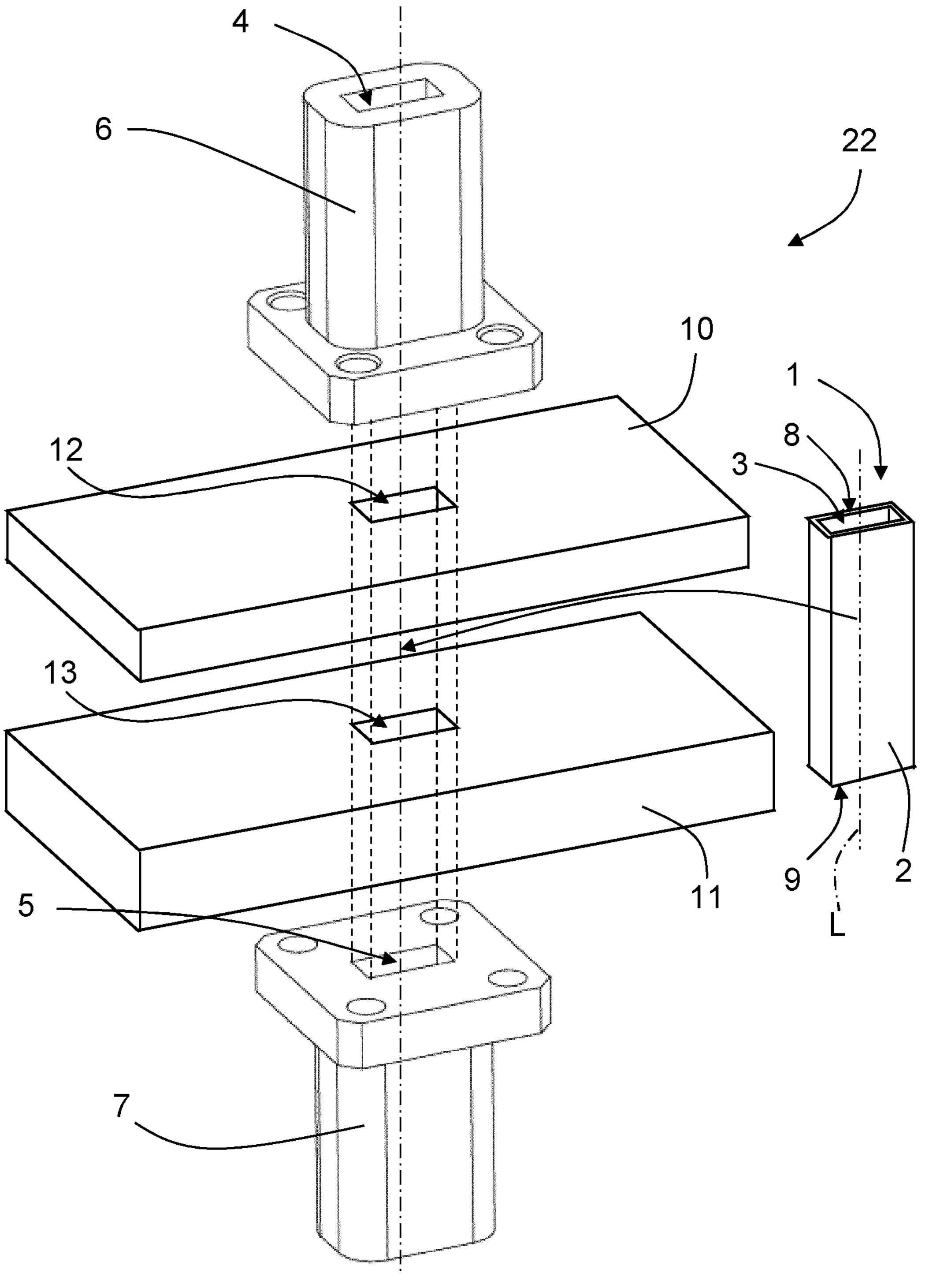
FIG. 1 schematically shows an exploded side perspective view of a waveguide interface according to a first example.

Aspects of the present disclosure will now be described more fully hereinafter with reference to the accompanying drawings. The different devices, systems, computer programs and methods disclosed herein can, however, be realized in many different forms and should not be construed as being limited to the aspects set forth herein. Like numbers in the drawings refer to like elements throughout the detailed description of the drawings.

The terminology used herein is for describing aspects of the disclosure only and is not intended to limit the invention. As used herein, the singular forms “a”, “an” and “the” are intended to include the plural forms as well, unless the context clearly indicates otherwise.

Figure 2:
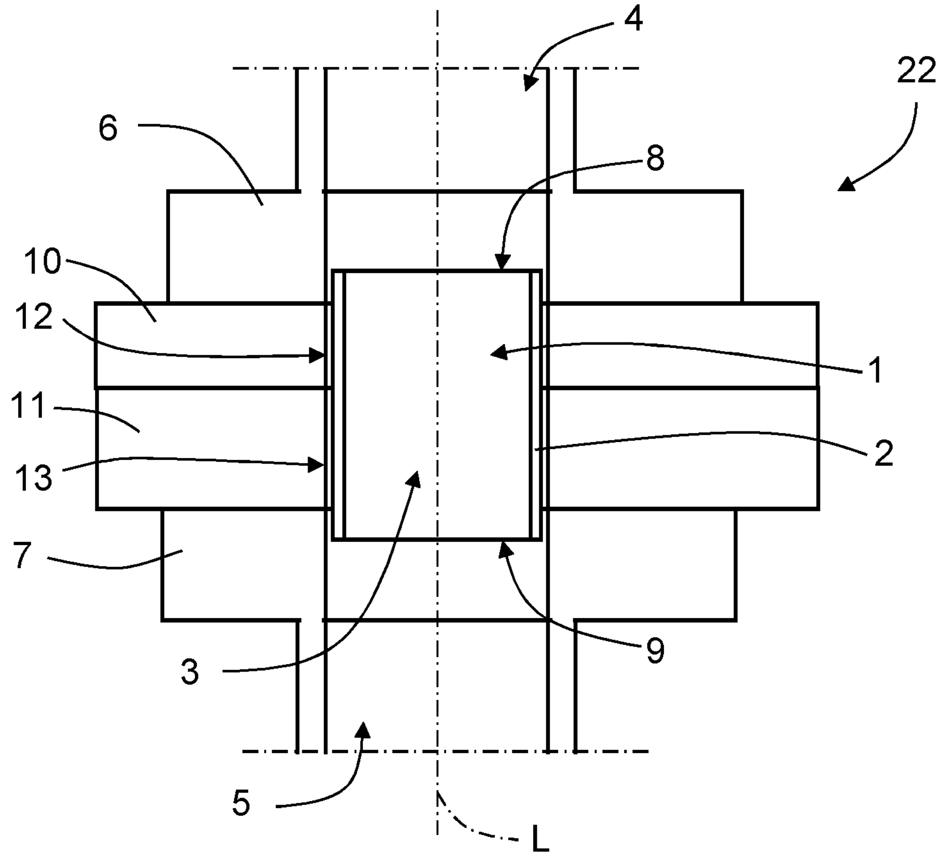
FIG. 2 schematically shows a cut-open side view of a waveguide interface according to the first example.

FIG. 1 and FIG. 2 show a first example of a waveguide interface 22, FIG. 1 showing an exploded side perspective view and FIG. 2 showing a cut-open side view. The waveguide interface 22 comprises a first waveguide aperture 4, provided in a first waveguide device 6, and a second waveguide aperture 5, provided in a second waveguide device 7. The waveguide devices 6, 7 are here in the form of waveguide connecting flanges that suitably are connected to other waveguide components via a waveguide connection (not shown). It should be noted that the waveguide devices 6, 7 can be of any suitable kind, for example wave guide filters, such as diplexers, waveguide to coaxial/microstrip/stripline transitions and electronic components with a waveguide interface such as microwave amplifiers. The waveguide devices 6, 7 need not be of the same kind.

The waveguide interface 22 further comprises a waveguide connecting tube 1 having a longitudinal extension L and comprising waveguide walls 2 and a connecting waveguide aperture 3 for transfer of microwave signals. According to the present disclosure, the waveguide connecting tube 1 comprises a first end 8 that is adapted to be at least partly inserted into the first waveguide aperture 4, and a second end 9 that is adapted to be at least partly inserted into the second waveguide aperture 5, such that the first waveguide aperture 4 and the second waveguide aperture 5 are electrically connected via the waveguide connecting tube 1.

This means that the waveguide devices 6, 7 can be electrically connected in an efficient manner, minimizing degradation of return loss due to misalignment as well as leakage without having to use RF gaskets.

This is even more emphasized in the case when one or more components are positioned between the waveguide devices 6, 7. According to some aspects, the waveguide connecting tube 1 is adapted to interact with at least one other component 10, 11 when electrically connecting the first waveguide aperture 4 to the second waveguide aperture 5, each other component 10, 11 comprising a corresponding component aperture 12, 13 adapted to interact with the waveguide connecting tube 1.

According to some aspects, the other component is a circuit board 10 and/or a cooling plate 11. In the present example, there is a first other component in the form of a circuit board 10 and a second other component in the form of a cooling plate 11. The cooling plate 11 is suitably a metal plate that is attached to the circuit board 10 and is for example adapted to create rigidity and dissipate heat generated by components connected to the circuit board 10.

As clearly shown in FIG. 2, the waveguide connecting tube 1 alleviates all kinds of misalignments that may occur between the first waveguide devices 6, the circuit board 10, the cooling plate 11 and the second waveguide device 7, and in particular between the corresponding apertures 4, 12, 13, 5.

Figure 3:
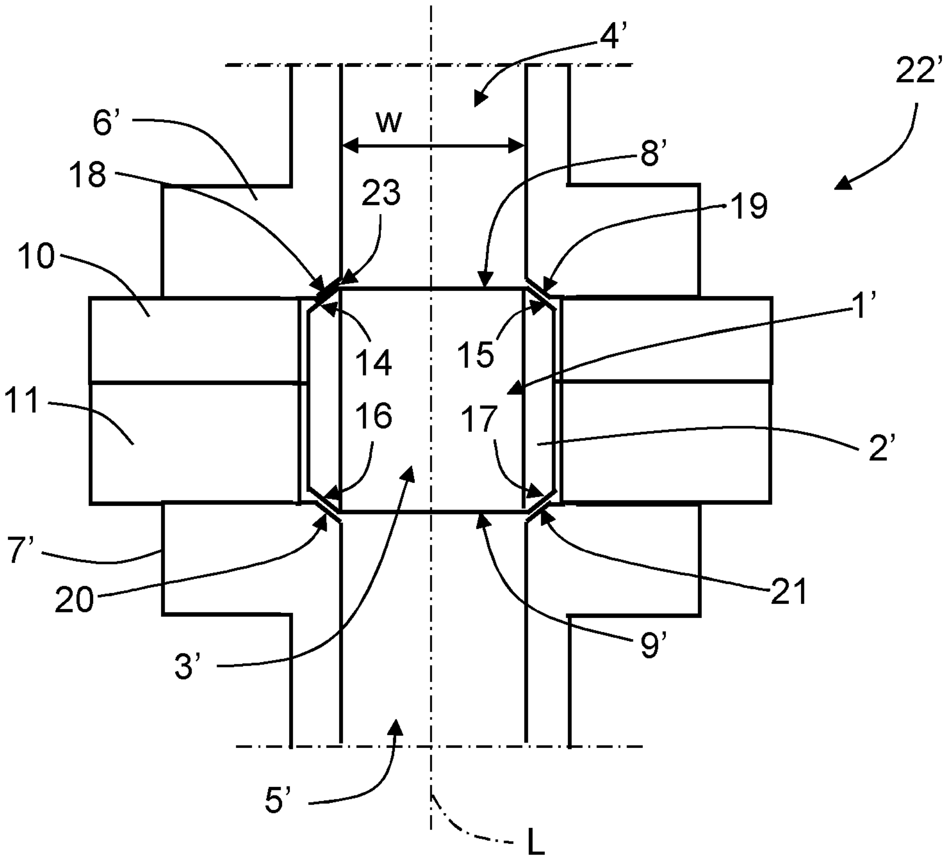
FIG. 3 schematically shows a cut-open side view of a waveguide interface according to a second example.

With reference to FIG. 3 that schematically shows a cut-open side view of a waveguide interface 22' according to a second example, according to some aspects, each end 8', 9' of the waveguide connecting tube 1' is chamfered to have corresponding edge chamfers 14, 15, 16, 17. The waveguide devices 6', 7' comprise corresponding edge tapers 18, 19, 20, 21 that are provided along an inner edge of the corresponding waveguide aperture 4, 5. The edge tapers 18, 19, 20, 21 are adapted to be engaged by the edge chamfers 14, 15 16, 17 of the waveguide connecting tube 1' and to provide alignment when the waveguide connecting tube 1' is inserted into each waveguide aperture 4', 5'.

In this way, both alignment and a secure fit is provided between the waveguide devices 6', 7' and the waveguide connecting tube 1' when the waveguide connecting tube 1' is inserted into the waveguide devices 6', 7'.

Here, the wall thickness of the waveguide connecting tube 1' does not affect the waveguide width w that is maintained constant all the way through the waveguide interface 22' since the aperture 12, 13 of the other components 10, 11 are adapted accordingly.

Having a width that is unaffected by the wall thickness of the waveguide connecting tube 1' can of course be achieved without having edge tapers 18, 19, 20, 21 that are adapted to engage edge chamfers 14, 15, 16, 17. For example, in FIG. 2, only a straight indent could be provided in the waveguide devices 6', 7' and the other components 10, 11, these indents having dimensions that corresponds to the wall thickness of the waveguide connecting tube 1'.

Figure 4:
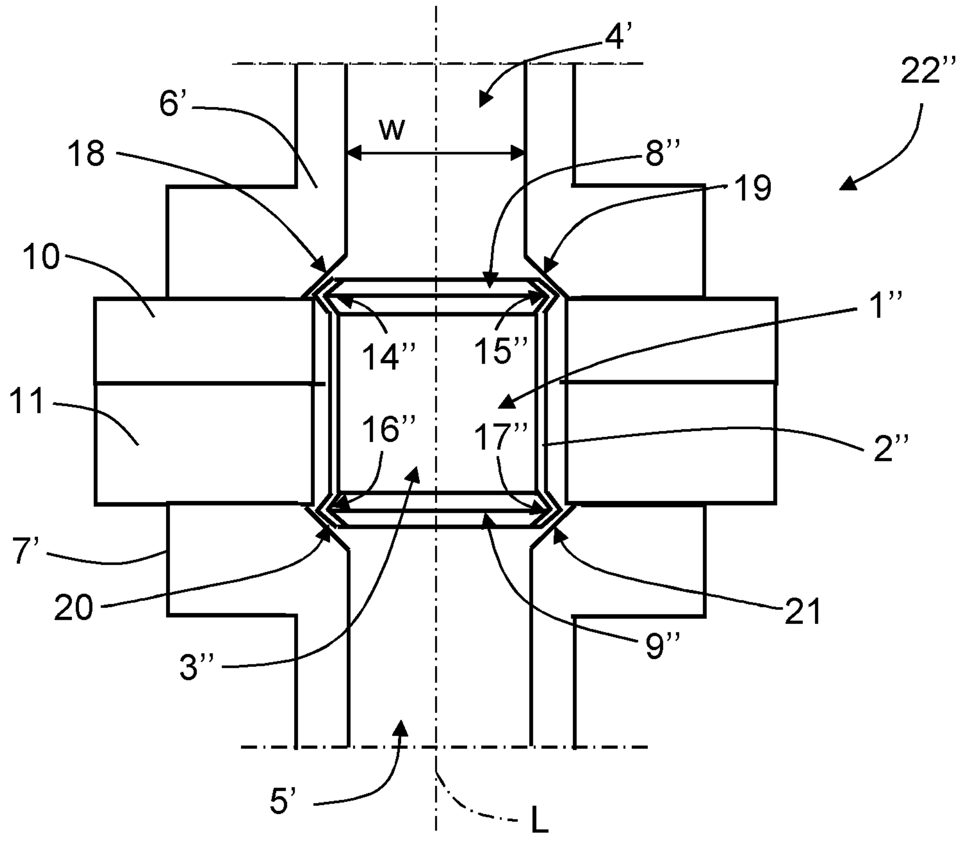
FIG. 4 schematically shows a cut-open side view of a waveguide interface according to a third example.

With reference to FIG. 4 that schematically shows a cut-open side view of a waveguide interface 22" according to a third example, according to some aspects, there is a waveguide interface 22" similar to the one described with reference to FIG. 3, but where each edge chamfer 14", 15", 16", 17" is deformable along its longitudinal extension L. The components of the waveguide interface 22" are the same as in the second example except the waveguide connecting tube 1" that comprises the corresponding edge chamfers 14", 15", 16", 17" that provide alignment into each waveguide aperture 4', 5'.

When the waveguide connecting tube 1" is inserted into the waveguide devices 6', 7', the edge chamfers 14", 15", 16", 17" engage the corresponding edge tapers 18, 19, 20, 21 of the waveguide devices 6', 7', and when submitted to pressure, the edge chamfers 14", 15", 16", 17" are deformed such that a secure electrical and mechanical connection between the waveguide connecting tube 1" and the waveguide devices 6', 7' is obtained. The deformable edge chamfers 14", 15", 16", 17" can for example be in the form of foldable metal fingers or by pre-folded parts that either are separately formed in sheet metal and attached to the rest of waveguide connecting tube 1" or formed in the same material as the rest of the waveguide connecting tube 1".

According to some aspects, as illustrated only for one edge taper 18 and corresponding edge chamfer 14 in FIG. 3, the waveguide interface comprises an electrically conductive paste 23 applied between each end 8', 9' and walls of the corresponding waveguide aperture 4', 5'. The electrically conductive paste 23 should normally be applied all along the ends 8, 8', 8"; 9, 9', 9" and walls of the corresponding waveguide aperture 4, 5; 4', 5', for example along all edge tapers 18, 19, 20, 21 and corresponding edge chamfers 14, 15, 16, 17, and may be applied for all types of waveguide interfaces. For example, solder paste or any other sort of electrically conductive paste can be used. The electrically conductive paste 23 provides enhanced electrical connections and reduces possible RF leakage.

It is to be noted that the drawings are of a schematic character, only illustrating principles and not realistic dimensions and relations between different parts. For example, the circuit board 10 is normally larger and thinner, and is provided with a plurality of components and electrical connections in form of metal tracks.

The present disclosure relates to the above waveguide interface 22. With reference to FIG. 1 and FIG. 2, the present disclosure also relates to a waveguide connecting tube 1 having a longitudinal extension L and comprising waveguide walls 2 and a connecting waveguide aperture 3 for transfer of microwave signals. The waveguide connecting tube 1 is adapted to electrically connect a first waveguide aperture 4, provided in a first waveguide device 6, to a second waveguide aperture 5, provided in a second waveguide device 7. The waveguide connecting tube 1 comprises a first end 8 that is adapted to be at least partly inserted into the first waveguide aperture 4, and a second end 9 that is adapted to be at least partly inserted into the second waveguide aperture 5, such that the first waveguide aperture 4 and the second waveguide aperture 5 are electrically connected via the waveguide connecting tube 1.

According to some aspects, the waveguide connecting tube 1 is adapted to interact with at least one other component 10, 11 when electrically connecting the first waveguide aperture 4 to the second waveguide aperture 5, each other component 10, 11 comprising a corresponding component aperture 12, 13 adapted to interact with the waveguide connecting tube 1.

According to some aspects, the other component is a circuit board 10 and/or a cooling plate 11.

According to some aspects, with reference to FIG. 3 and FIG. 4, each end 8', 9'; 8", 9" of the waveguide connecting tube 1', 1" is chamfered to have corresponding edge chamfers 14, 15 16, 17; 14", 15", 16", 17" that are adapted to provide alignment into each waveguide aperture 4', 5'.

According to some aspects, with reference to FIG. 4, each edge chamfer 14", 15", 16", 17" is deformable along the longitudinal extension L.

Figure 5:
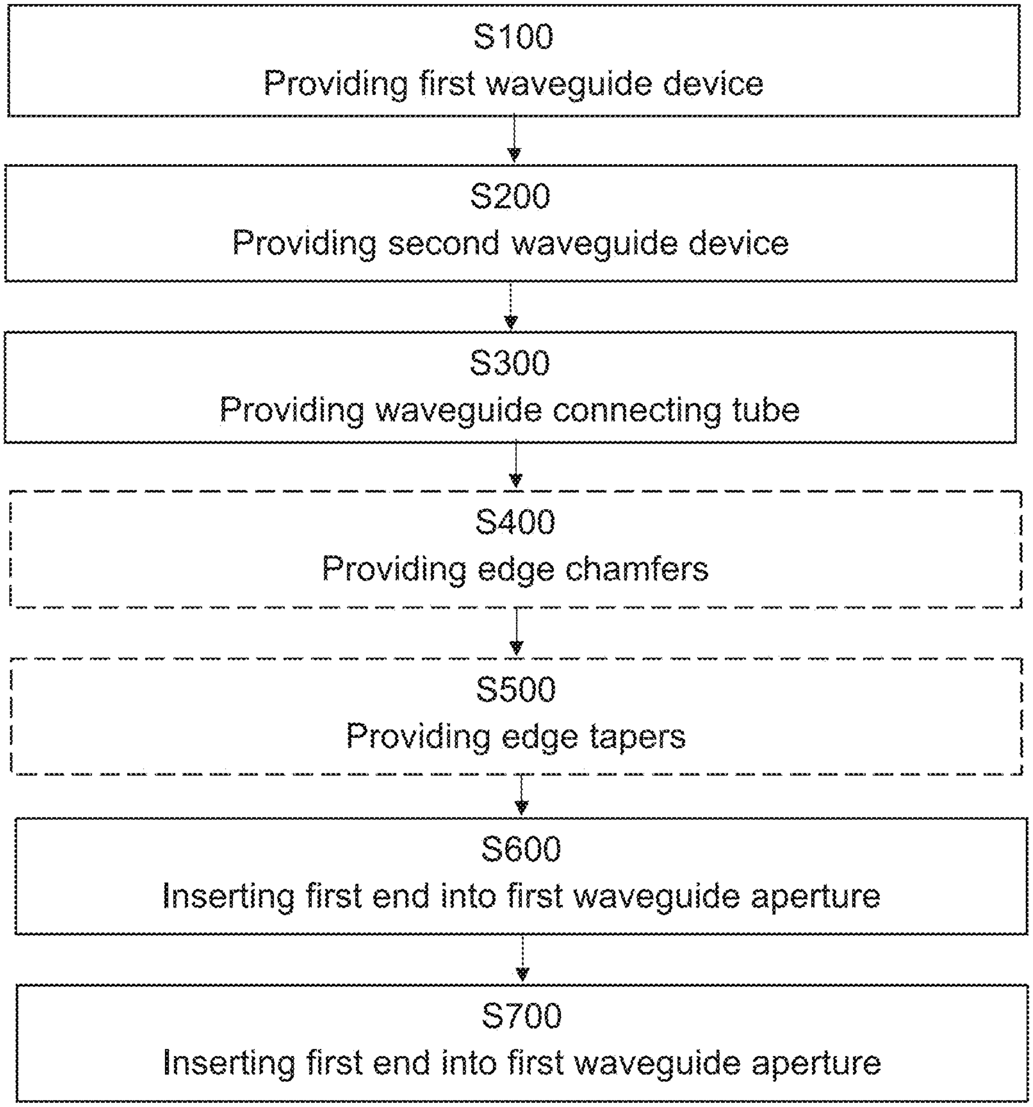
FIG. 5 shows a flowchart for methods according to the present disclosure.

With reference to FIG. 5, the present disclosure also relates to a method for assembling a waveguide interface 22, where the method comprises providing S100 a first waveguide device 6 with a first waveguide aperture 4, providing S200 a second waveguide device 7 with a second waveguide aperture 5, and providing S300 a waveguide connecting tube 1 having a first end 8 and a second end 9. The method further comprises inserting S600 the first end 8 into the first waveguide aperture 4, and inserting S700 the second end 9 into the second waveguide aperture 5, such that the first waveguide aperture 4 and the second waveguide aperture 5 are electrically connected via the waveguide connecting tube 1.

According to some aspects, the method comprises providing S400 edge chamfers 14, 15 16, 17; 14", 15", 16", 17" at each end 8', 9'; 8", 9" of the waveguide connecting tube 1', 1" and providing S500 corresponding edge tapers 18, 19, 20, 21 at each waveguide device 6', 7'. The edge chamfers 14, 15 16, 17; 14", 15", 16", 17" and edge tapers 18, 19, 20, 21 are used for providing alignment by mutual engagement when inserting the waveguide connecting tube 1', 1" into each waveguide aperture 4', 5'.

The present disclosure is not limited to the above, but may vary freely within the scope of the appended claims. For example, there can be less or more than the two other components 10, 11 shown.

The present disclosure presents a new type of building practice where this principle can be used to connect several waveguide components in an aligned manner, for example when connecting a diplexer to an antenna. Furthermore, component cooling will be heavily improved by means of the present disclosure.

The invention claimed is:

1. A waveguide connecting tube having a longitudinal extension and comprising waveguide walls and a connecting waveguide aperture for transfer of microwave signals, wherein the waveguide connecting tube is adapted to electrically connect a first waveguide aperture, provided in a first waveguide device, to a second waveguide aperture, provided in a second waveguide device, where the waveguide connecting tube comprises a first end that is adapted to be at least partly inserted into the first waveguide aperture, and a second end that is adapted to be at least partly inserted into the second waveguide aperture, such that the first waveguide aperture and the second waveguide aperture are electrically connected via the waveguide connecting tube;

wherein each end of the waveguide connecting tube is chamfered to have corresponding edge chamfers that are adapted to provide alignment into each waveguide aperture.

2. The waveguide connecting tube according to claim 1, wherein the waveguide connecting tube is adapted to interact with at least one other component when electrically connecting the first waveguide aperture to the second waveguide aperture, each other component comprising a corresponding component aperture adapted to interact with the waveguide connecting tube.

3. The waveguide connecting tube according to claim 2, wherein the other component is a circuit board and/or a cooling plate.

4. The waveguide connecting tube according to claim 1, wherein each edge chamfer is deformable along the longitudinal extension.

5. A waveguide interface comprising a first waveguide aperture, provided in a first waveguide device, a second waveguide aperture, provided in a second waveguide device, and a waveguide connecting tube having a longitudinal extension and comprising waveguide walls and a connecting waveguide aperture for transfer of microwave signals, wherein the waveguide connecting tube comprises a first end that is adapted to be at least partly inserted into the first waveguide aperture, and a second end that is adapted to be at least partly inserted into the second waveguide aperture, such that the first waveguide aperture and the second waveguide aperture are electrically connected via the waveguide connecting tube;

wherein each end of the waveguide connecting tube is chamfered to have corresponding edge chamfers, where the waveguide devices comprise corresponding edge tapers that are adapted to be engaged by the edge chamfers of the waveguide connecting tube and to provide alignment when the waveguide connecting tube is inserted into each waveguide aperture.

6. The waveguide interface according to claim 5, wherein each edge taper is deformable along the longitudinal extension.

7. The waveguide interface according to claim 5, wherein the waveguide connecting tube is adapted to interact with at least one other component when electrically connecting the first waveguide aperture to the second waveguide aperture, each other component comprising a corresponding component aperture adapted to interact with the waveguide connecting tube.

8. The waveguide interface according to claim 7, wherein the other component is a circuit board and/or a cooling plate.

9. The waveguide interface according to claim 5, wherein the waveguide interface comprises an electrically conductive paste applied between each end and walls of the corresponding waveguide aperture.

10. A method for assembling a waveguide interface, where the method comprises:

providing a first waveguide device with a first waveguide aperture, providing a second waveguide device with a second waveguide aperture, providing a waveguide connecting tube having a first end and a second end;

inserting the first end into the first waveguide aperture, and inserting the second end into the second waveguide aperture, such that the first waveguide aperture and the second waveguide aperture are electrically connected via the waveguide connecting tube;

wherein the method comprises:

providing edge chamfers at each end of the waveguide connecting tube; and providing corresponding edge tapers at each waveguide device; where the edge chamfers and edge tapers are used for providing alignment by mutual engagement when inserting the waveguide connecting tube into each waveguide aperture.

11. The method according to claim 10, wherein the waveguide connecting tube is interacting with at least one other component when electrically connecting the first waveguide aperture to the second waveguide aperture, each other component having a corresponding component aperture adapted to interact with the waveguide connecting tube.

* * * * *